(No Model.) 2 Sheets—Sheet 1.
S. H. KIMBALL.
VELOCIPEDE.
No. 471,358. Patented Mar. 22, 1892.
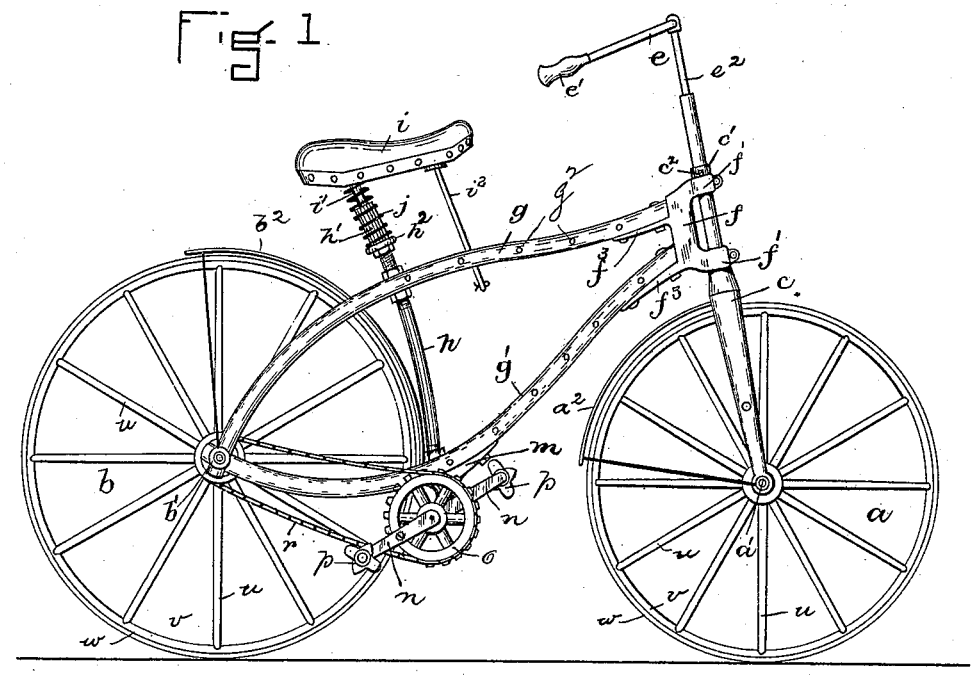
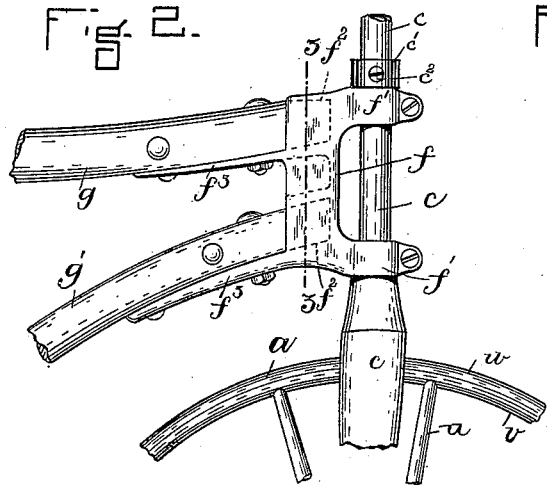
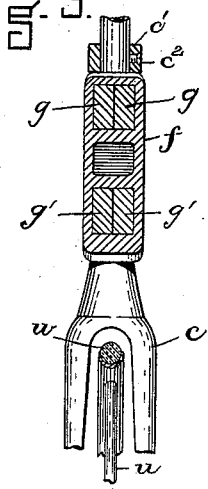
WITNESSES.
James J. Ball,
Ewing W. Hamlin.
INVENTOR.
S. H. Kimball
by Wright Brown Crossley
Attys

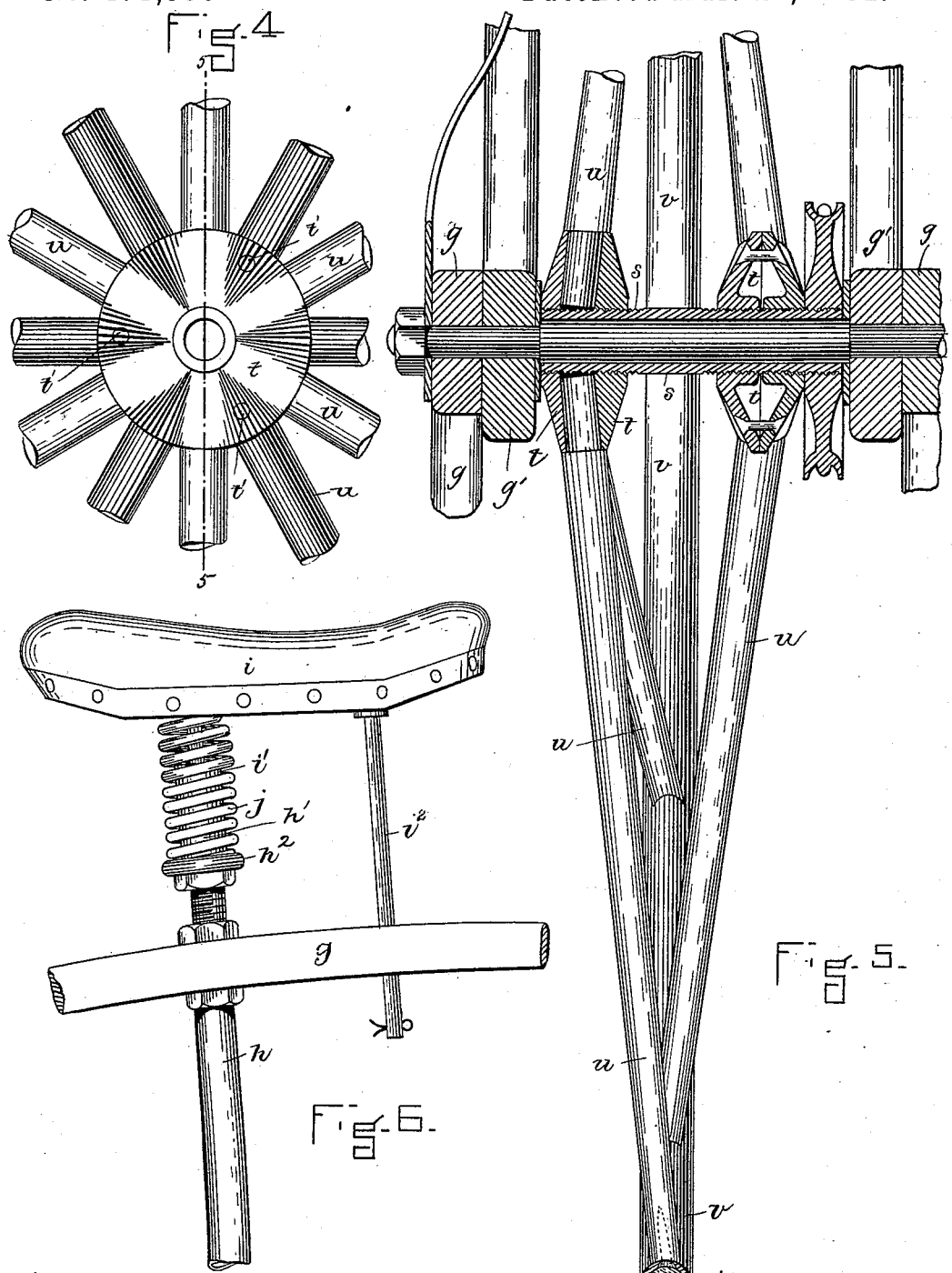

UNITED STATES PATENT OFFICE.

STEPHEN H. KIMBALL, OF EVERETT, MASSACHUSETTS.

VELOCIPEDE.

SPECIFICATION forming part of Letters Patent No. 471,358, dated March 22, 1892.

Application filed March 9, 1891. Serial No. 384,232. (No model.)

*To all whom it may concern:*

Be it known that I, STEPHEN H. KIMBALL, of Everett, in the county of Middlesex and State of Massachusetts, have invented certain new and useful Improvements in Velocipedes, of which the following is a specification.

This invention has for its object to provide a bicycle of the class known as "Safety" bicycles, of simple, strong, and inexpensive construction; and it consists in the improvements which I will now proceed to describe and claim.

Of the accompanying drawings, forming a part of this specification, Figure 1 represents a side elevation of a bicycle embodying my improvements. Fig. 2 represents a similar view, on an enlarged scale, of a portion of the bicycle shown in Fig. 1. Fig. 3 represents a section on line 3 3 of Fig. 2. Fig. 4 represents a side view of the hub and inner ends of the spokes of a wheel embodying improvements. Fig. 5 represents a sectional view of the rear wheel, taken on the plane of line 5 5 of Fig. 4. Fig. 6 represents a side view of the saddle and its support.

The same letters of reference indicate the same parts in all the figures.

In the drawings, $a$ represents the front and $b$ the back or rear wheel of my improved bicycle.

$c$ represents a fork of any suitable construction, one member of the bifurcated end of said fork coming down on each side of the front wheel, said members having the axle $a'$ of the front wheel $a$ suitably journaled in their lower ends. The upper end of the fork $c$ carries the handle-bar $e$, having suitable handles $e'$ at each end, by which the fork may be turned to guide the bicycle, as usual.
The fork $c$ is journaled in the head $f$. The said head is of the form shown in Figs. 1 and 2, having two ears or lugs $f'$ projecting forward, forming the bearings in which the fork $c$ is journaled, and adapted to be revolved by means of the handle. Said head is also provided with two sockets $f^2$, adapted to receive the ends of the members of the frame or backbone of the bicycle, and with two backwardly-projecting ears or lugs $f^3$ below said sockets or recesses $f^2$, adapted to be attached to and form a support for the said members of the main frame.

$g\ g'$ represent the two members of the main frame of the bicycle, the forward ends of which are received in the sockets $f^2$ in the head $f$ and attached to the ears $f^3$ by bolts or screws. Each of the said members is composed of two pieces, which are bolted together by bolts $g^2\ g^2$. The forward ends of the two pieces composing each of the members $g\ g'$ are close together at their forward ends and for a portion of their length, while their rear ends are separated, so as to project one on each side of the rear wheel $b$, forming forks in which said wheel is adapted to run. The axle $b'$ of the rear wheel is suitably journaled in the rear ends of the pieces composing the members $g$ and $g'$, as shown in Fig. 1.

$h$ represents a brace or stay connecting the two members $g\ g$ of the frame of the bicycle and passing upwardly through the member $g$ to form a support for the saddle $i$.

The members $g\ g'$ are preferably of about the form shown in Fig. 1, each member having an outward curve or arch, and the brace $h$ connects them at about the point where they are farthest apart. The ends of the brace $h$ are preferably screw-threaded and are engaged with nuts or sockets formed therefor in the members $g\ g'$. It will thus be seen that the members $g\ g'$ and the brace $h$ form a frame having a double arch, said arches being joined by a brace or stay, thus making a very strong frame-work capable of sustaining a very considerable weight.

Attached to or formed on the upper end of the brace $h$ is a tubular portion $h'$, which receives a pin $i'$, attached to the saddle, the said pin sliding in the said tubular piece $h'$. A spring $j$ is interposed between the saddle $i$ and a nut or projection $h^2$ on the tubular portion $h'$ above the member $g$, said spring being of such strength that it will support the saddle with the weight of the rider upon it at such a height that the upper end of the tube $h'$ will not touch the same, so that the saddle will be yieldingly supported by the said spring $j$. The forward part of the saddle $i$ has another downwardly-projecting pin $i^2$, which passes through a hole made for it in the member $g$ and acts as a guide to keep the saddle in proper position, being adapted to slide up and down through the member $g$ in the same manner that the pin $i'$ does in the tube $h'$ at the upper end of the brace $h$, the pins $i'$ and $i^2$ being parallel to each other. By these devices it will readily be seen that the saddle is yieldingly supported, so as to be adapted to "give" when there is any weight upon it and to have sufficient "spring" to insure comfort to the rider in traveling over rough roads.

To the lower side of the member $g'$ is affixed a bracket $m$, in which is journaled the shaft or axle which supports the cranks $n\ n$ and driving sprocket-wheel $o$. The cranks $n\ n$ are provided with the usual pedals $p\ p$. The sprocket-wheel $o$ has a sprocket-chain $r$ running over it and passing around a sprocket-wheel on the axle of the rear wheel $b$, by means of which said wheel $b$ is driven by working the cranks in the usual manner. The driving mechanism above described is old and well known, and I do not desire to limit myself to any particular form of driving mechanism.

The wheels $a$ and $b$ may be provided with the usual or any suitable form of mud-guard $a^2\ b^2$, the same being also old and well-known and requiring no description here.

The wheels which I use in my bicycle (herein described) are of an improved construction, which I will now proceed to describe. The axle of each wheel, suitably journaled, as before described, has upon it a sleeve $s$, having its ends externally screw-threaded with a right thread at one end and a left thread at the other. Upon each end of said sleeve is screwed a hub $t$, adapted to receive the inner ends of the spokes of the wheel. Each hub $t$ is made in two parts, as shown in Fig. 5. The two parts of each hub $t$ are securely bolted or riveted together and are provided with sockets to receive the ends of the spokes $u$. Each alternate spoke is socketed in the left or right hub, respectively, as is usual in wheels of this class. The ends of the spokes are received between the two parts forming each hub, one part forming one side of the socket, while the other part forms the other side. The bolts $t'\ t'$, connecting the two parts of each hub, are located between the points where the spokes enter the hub. The parts of the hub are preferably of metal and are made so as to have solid portions at the points where the sockets for the spokes are made and to have hollowed-out portions intermediate thereof, as will be readily understood from Fig. 5. This construction not only lightens the structure, but gives it a suitable spring, whereby when the two parts of the hub are riveted or bolted together at points intermediate of the spokes, as described, they will be enabled to hold the ends of the spokes firmly in their sockets.

The central or unthreaded portion of the sleeve $s$ may be made square, hexagonal, or of other suitable form to be engaged by a wrench, or it may be provided with holes adapted to receive the projecting fingers of a spanner whereby the sleeve may be turned. The left and right threads on the ends of said sleeve enable the same to draw the two hubs $t\ t$ together when the sleeve is turned and the wheel held, thus tightening up the wheel and rendering it properly rigid.

The outer ends of the spokes $u$ may be affixed to the rim $v$ in any suitable way, the rim being of metal. Said rim is made so that it can be attached to the spokes and is shaped to hold a rubber tire $w$ without the use of a wooden rim or felly. If desired, I may make the rim $v$ to serve without a rubber tire, although I prefer to use the latter.

The members $g\ g'$ of the frame of the bicycle are preferably of hard wood, and the spokes of the wheels may be of the same material.

The saddle may be raised or lowered and adjusted at different heights to suit different riders by means of the nut $h^2$ on the tubular portion $h'$. The said nut $h^2$ is contracted and internally screw-threaded and engages a screw-thread on the upper end of the brace $h$, the tubular portion $h'$ being of larger internal diameter than said nut and inclosing the upper end of the brace $h$ without touching the same.

The handle is movable up and down to suit different riders. The upper part of the fork $c$ is made tubular and receives a rod $e^2$, to which the handle-bar $e$ is affixed. On the said tubular portion is a collar $c'$, preferably just above the upper arm $f'$ of the head. The collar $c'$ is provided with a set-screw $c^2$, which may be turned up tight against the tubular portion of the fork $c$, and is adapted to slightly compress the same. When it is desired to move the handle up or down, the screw $c^2$ is slightly loosened, and the handle is then adjusted to its required position and the screw $c^2$ again tightened up, thus compressing the tubular portion of the fork $c$ upon the bar or rod $e^2$ and holding the handle firmly fixed at its desired position. It is to be understood that the collar $c'$ has its internal diameter slightly greater than the external diameter of the tubular portion of the fork in order to permit slight expansion of two sides of said tubular portion when the other two sides are compressed by the set-screw $c^2$ and that portion of the collar diametrically opposite said set-screw.

It will be seen that the whole construction is simple, strong, and inexpensive, forming a bicycle adapted to stand a good deal of rough usage and not easily damaged.

I do not limit myself to the exact construction and arrangement of parts here shown and described, but may vary the same in several particulars without departing from the spirit of my invention.

I claim—

1. In a velocipede, the combination, with the front and rear wheels and the front fork, of the metallic head $f$, having the two sockets $f^2$, the frame-bars $g\ g'$, each composed of two pieces of wood united at the front portions and separated at the rear to form the rear fork, each of said pair of pieces entering a socket $f^2$ and the two pairs being oppositely curved and connected by a brace $h$, substantially as described.

2. In a velocipede, the improved saddle-support consisting of a tubular projection projecting upwardly from the main frame or backbone, a pin on the saddle entering said tubular projection and adapted to slide therein, a spring adapted to be interposed between the saddle and a rigid support on said tubular projection, adapted to yieldingly support the saddle, and a pin attached to another part of the saddle and entering a guide therefor in the backbone or frame, the said two pins being parallel with each other, as set forth.

3. In a velocipede, the improved head having forwardly-projecting ears or lugs adapted to receive and afford a bearing for the fork of the velocipede, two sockets or recesses adapted to receive the ends of the members of the main frame, and two backwardly-projecting ears or lugs adapted to be attached to and afford a support for said members, as set forth.

4. The combination, with a front and rear wheel, a fork in the lower end of which the axle of the front wheel is journaled, and a steering-handle at the upper end of said fork, of the head $f$, having the forwardly-projecting ears in which the said fork is journaled, the two outwardly-arched frame members $g\ g'$, having their forward ends socketed in and attached to the head $f$ and having the axle of the rear wheel journaled in their rear ends, the brace $h$, connecting the two curved or arched frame members at about the point where they are farthest apart and having an upward projection above the uppermost frame member, a saddle supported by said upward projection, driving mechanism suitably journaled in a bracket affixed to the lowermost frame member, and means for connecting said driving mechanism with the rear wheel, whereby the latter may be driven, as set forth.

5. In a velocipede, the improved saddle-support consisting of an upward projection of the brace or cross-piece of the main frame, the same being externally screw-threaded, a nut engaged therewith, a tubular piece affixed to said nut of larger internal diameter than said nut, adapted to surround the threaded portion of the said brace, a pin on the saddle, entering said tubular portion and adapted to slide therein, a spring interposed between the saddle and the nut on the brace, adapted to yieldingly support the saddle, and a pin attached to another part of the saddle and entering a guide therefor in the backbone or frame, the said two pins on the saddle being parallel with each other, as set forth.

6. In a velocipede, the improved adjustable handle-support comprising the fork $c$, the upper portion of which is tubular, the rod $e^2$, entering said tubular portion, the collar $c'$ on the fork $c$, provided with a set-screw which is adapted to compress said tubular portion upon the rod $e^2$, and a suitable handle mounted on the rod $e^2$, as set forth.

In testimony whereof I have signed my name to this specification, in the presence of two subscribing witnesses, this 28th day of February, A. D. 1891.

STEPHEN H. KIMBALL.

Witnesses:
  C. F. BROWN,
  EWING W. HAMLEN.